(12) United States Patent
Hardman et al.

(10) Patent No.: US 9,722,248 B2
(45) Date of Patent: Aug. 1, 2017

(54) ELECTRODE FORMULATIONS COMPRISING GRAPHENES

(71) Applicant: Cabot Corporation, Boston, MA (US)

(72) Inventors: Ned J. Hardman, Belmont, CA (US); Berislav Blizanac, Acton, MA (US); Aurelien L. DuPasquier, Westford, MA (US); Miodrag Oljaca, Concord, MA (US); Agathagelos Kyrlidis, Cambridge, MA (US)

(73) Assignee: Cabot Corporation, Boston, MA (US)

( * ) Notice: Subject to any disclaimer, the term of this patent is extended or adjusted under 35 U.S.C. 154(b) by 182 days.

(21) Appl. No.: 14/405,793

(22) PCT Filed: Jun. 19, 2013

(86) PCT No.: PCT/US2013/046456
§ 371 (c)(1),
(2) Date: Dec. 5, 2014

(87) PCT Pub. No.: WO2013/192258
PCT Pub. Date: Dec. 27, 2013

(65) Prior Publication Data
US 2015/0194674 A1    Jul. 9, 2015

Related U.S. Application Data

(60) Provisional application No. 61/661,999, filed on Jun. 20, 2012.

(51) Int. Cl.
*H01M 4/36*    (2006.01)
*H01M 4/587*   (2010.01)
(Continued)

(52) U.S. Cl.
CPC ......... *H01M 4/587* (2013.01); *H01M 4/0402* (2013.01); *H01M 4/1393* (2013.01);
(Continued)

(58) Field of Classification Search
None
See application file for complete search history.

(56) References Cited

U.S. PATENT DOCUMENTS

| 2003/0165739 | A1  | 9/2003 | Kizu et al. |
| 2011/0111299 | A1* | 5/2011 | Liu ........................ B82Y 30/00 429/221 |

(Continued)

FOREIGN PATENT DOCUMENTS

| CN | 102013477 A | 4/2011 |
| EP | 2034541 B1 | 3/2009 |

(Continued)

OTHER PUBLICATIONS

International Search Report and Written Opinion of the International Searching Authority, or the Declaration of International Patent Application No. PCT/US2013/046456, mailed on Oct. 7, 2013.

*Primary Examiner* — Scott J Chmielecki

(57) ABSTRACT

Disclosed herein are cathode formulations comprising graphenes. One embodiment provides a cathode formulation comprising an electroactive material, and graphene interspersed with the electroactive material, wherein a ratio of (mean electroactive material domain size)/(mean graphene lateral domain size) ranges from 3:2 to 15:1. Also disclosed are cathodes comprising such materials and methods of making such cathodes.

20 Claims, 2 Drawing Sheets

Figure 1:
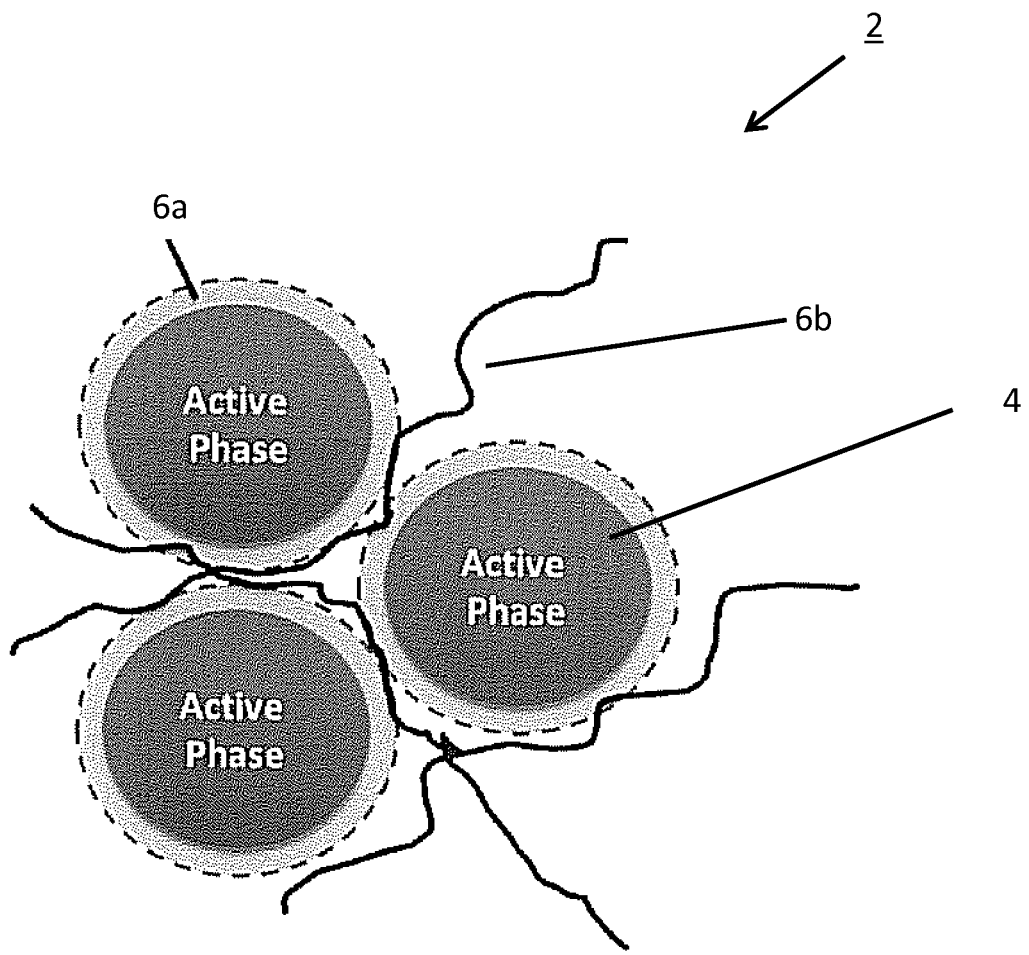

(51) Int. Cl.
*H01M 4/62*     (2006.01)
*H01M 4/04*     (2006.01)
*H01M 4/1393*   (2010.01)
*H01M 4/131*    (2010.01)
*H01M 4/02*     (2006.01)

(52) U.S. Cl.
CPC ........... H01M 4/364 (2013.01); H01M 4/623 (2013.01); H01M 4/625 (2013.01); *H01M 4/131* (2013.01); *H01M 2004/021* (2013.01); *H01M 2004/028* (2013.01)

(56) References Cited

U.S. PATENT DOCUMENTS

| | | | |
|---|---|---|---|
| 2011/0159372 A1* | 6/2011 | Zhamu | H01G 11/38 429/232 |
| 2011/0227001 A1 | 9/2011 | Schulz-Dobrick et al. | |
| 2011/0281174 A1 | 11/2011 | Seymour | |
| 2012/0034522 A1* | 2/2012 | Sheem | H01M 4/13 429/213 |
| 2012/0045692 A1 | 2/2012 | Takemura et al. | |
| 2013/0162216 A1* | 6/2013 | Zhamu | H01G 11/06 320/130 |

FOREIGN PATENT DOCUMENTS

| | | |
|---|---|---|
| JP | 2013/030463 A | 2/2013 |
| JP | 2014/112540 A | 6/2014 |
| WO | WO 2011/079238 A1 | 6/2011 |
| WO | WO 2012/023464 A1 | 2/2012 |
| WO | WO 2012/075960 A1 | 6/2012 |

* cited by examiner

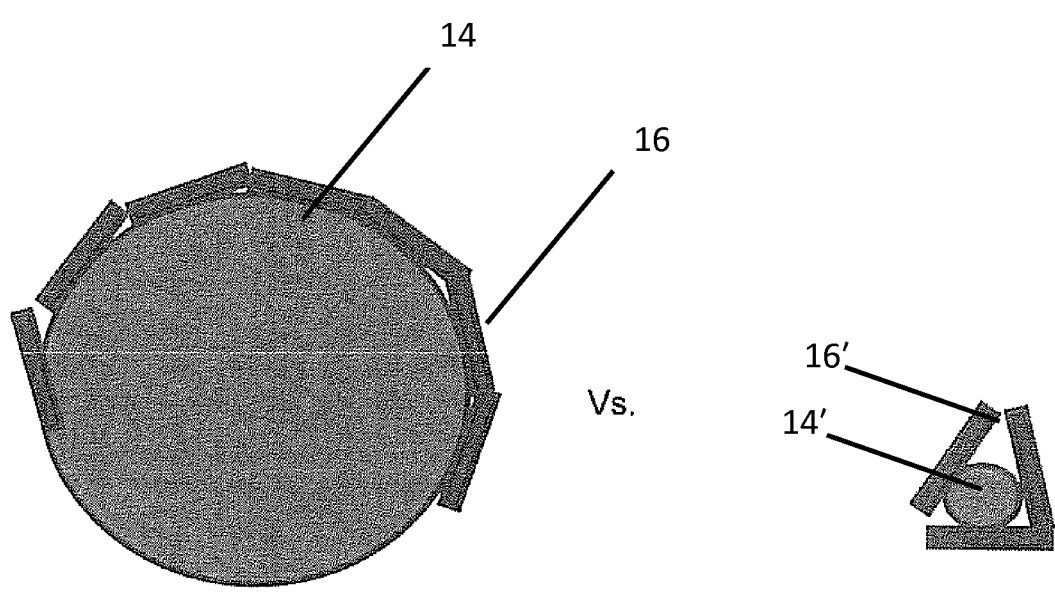
*FIG. 2A*  *FIG. 2B*

ELECTRODE FORMULATIONS COMPRISING GRAPHENES

This application is a §371 national phase application of and claims priority to PCT/US2013/046456, filed on Jun. 19, 2013, which claims priority to U.S. Provisional Patent Application No. 61/661,999, filed on Jun. 20, 2012, which are incorporated in their entirety by reference herein.

FIELD OF THE INVENTION

Disclosed herein are cathode formulations comprising graphenes, cathodes made therefrom, and methods of making such cathode formulations.

BACKGROUND

Much effort has been focused on improving the performance of rechargeable batteries, such as those containing lithium ion-based cathodes. The active cathode material is capable of absorbing and desorbing lithium ions under a voltage differential to the anode in repeatable fashion. Because these materials are typically poor conductors, conductive carbon-based additives are often added to impart conductivity to the cathode. However, due to the continual upward demands of batteries for newer and ever-expanding types of electronic devices and for automobiles, there remains a need to improve the performance of rechargeable batteries.

SUMMARY

One embodiment provides a cathode formulation comprising:
an electroactive material; and
graphene interspersed with the electroactive material;
wherein a ratio of (mean electroactive material domain size)/(mean graphene lateral domain size) ranges from 3:2 to 15:1.

Another embodiment provides a cathode comprising:
an electroactive material; and
graphene interspersed with the electroactive material;
wherein a ratio of (mean electroactive material domain size)/(mean graphene lateral domain size) ranges from 3:2 to 15:1.

Another embodiment provides a method of making a cathode, comprising:
combining particles comprising an electroactive material, a graphene, and a binder in the presence of a solvent to produce a paste having a solids loading of at least 80%, wherein a ratio of (mean electroactive material domain size)/(mean graphene lateral domain size) ranges from 3:2 to 15:1; and
depositing the paste onto a substrate; and
forming the cathode.

Another embodiment provides a cathode paste containing particles comprising:
an electroactive material;
a graphene; and
a binder;
wherein a ratio of (mean electroactive material domain size)/(mean graphene lateral domain size) ranges from 3:2 to 15:1, and
wherein the paste has a solids loading of at least 65%.

BRIEF DESCRIPTION OF THE DRAWING(S)

FIG. 1 is a schematic cross-section of the domains of electroactive material and graphene, and features the short range and long range conductivity pathways; and FIG. 2A is a schematic cross-section of the relative domain sizes of electroactive material and graphene in a ratio ranging from 3:2 to 15:1; and FIG. 2B is a schematic cross-section of the relative domain sizes of electroactive material and graphene in a ratio below the range of 3:2 to 15:1.

DETAILED DESCRIPTION

Disclosed herein are cathode formulations comprising graphenes. One embodiment provides a cathode formulation comprising:
an electroactive material; and
graphene interspersed with the electroactive material;
wherein a ratio of (mean electroactive material domain size)/(mean graphene lateral domain size) ranges from 3:2 to 15:1.

In one embodiment, the cathode formulation comprises the graphene interspersed with the electroactive material. It has been discovered that the use of graphene as a conductive carbon-based material results in improved cathode performance (and thus, overall battery performance) compared to cathodes comprising more traditional conductive carbon materials such as graphite, carbon black, carbon nanotubes, etc. In one embodiment, the cathode formulation can take the form of a paste or slurry in which particulate electroactive material and graphene is combined in the presence of a solvent. In another embodiment, the cathode formulation is a solid material resulting from solvent removal from the paste/slurry. In yet another embodiment, the cathode formulation is provided in a cathode.

It has been discovered that cathode performance can be enhanced by optimizing the relationship between mean domain size of the electroactive material and the graphene lateral domain size, wherein the ratio of (mean electroactive material domain size)/(mean graphene lateral domain size) ranges from 3:2 to 15:1, e.g., a ratio ranging from 3:2 to 10:1. "Domain size" can be used to define the size of discrete particles or regions of a material within a solid. For example, "electroactive material domain size" as used herein encompasses the largest dimension of the electroactive material domain (e.g., particle). The domain can take the form of various shapes, e.g., cuboids, spheroids, plates, or irregular shapes, whether discrete, encompassed in a paste, or encompassed in a solid matrix. For example, the electroactive material can be comprised of 2 μm particles agglomerated into a discrete 10 μm larger particle. In this example, the domain size of the electroactive material is 10 μm. In one embodiment, the cathode formulation comprises electroactive material having a mean domain size ranging from 3 to 20 μm, e.g., from 3 to 15 μm, from 5 to 20 μm or from 5 to 12 μm. In one embodiment, domain size (e.g., in a solid cathode material) can be determined by scanning electron microscopy (SEM), e.g., field emission SEM (FE-SEM), or other methods known in the art.

"Graphene" as used herein comprises stacked sheets, in which each sheet comprises $sp^2$-hybridized carbon atoms bonded to each other to form a honey-comb lattice. In one embodiment, the graphene comprises few-layer graphenes (FLG), having 2 or more stacked graphene sheets, e.g., a 2-20 layer graphene. In another embodiment, the graphene (i.e., the FLG) comprises a 3-15 layer graphene. In one embodiment, a portion of the graphene (i.e., the FLG) can include single-layer graphene and/or graphene having more than 15 or more than 20 layers so long as at least 80%, at least 85%, at least 90%, or at least 95% of the graphene comprises 2-20 layer graphene. In another embodiment, at least 80%, at least 85%, at least 90%, or at least 95% of the graphene comprises 3-15 layer graphene.

The dimensions of graphenes are typically defined by thickness and lateral domain size. Graphene thickness generally depends on the number of layered graphene sheets. The dimension transverse to the thickness is referred to herein as the "lateral" dimension or domain. In one embodiment, the graphene has a mean lateral domain size ranging from 0.5 to 10 μm, e.g., ranging from 1 μm to 5 μm.

The graphenes can exist as discrete particles and/or as aggregates. "Aggregates" refers to a plurality of graphene particles (FLG) that are adhered to each other. For graphene aggregates, "mean lateral domain size" refers to the longest indivisible dimension or domain of the aggregate. Thickness of the aggregates is defined as the thickness of the individual graphene particle.

In one embodiment, the surface area of the graphene is a function of the number of sheets stacked upon each other and can be calculated based on the number of layers. In one embodiment, the graphene has no microporosity. For example, the surface area of a graphene monolayer with no porosity is 2700 m$^2$/g. The surface area of a 2-layer graphene with no porosity can be calculated as 1350 m$^2$/g. In another embodiment, the graphene surface area results from the combination of the number of stacked sheets and amorphous cavities or pores. In one embodiment, the graphene has a microporosity ranging from greater than 0% to 50%, e.g., from 20% to 45%. In one embodiment, the graphene has a BET surface area ranging from 40 to 1600 m$^2$/g, from 60 to 1000 m$^2$/g, or a BET surface area ranging from 80 to 800 m$^2$/g.

In one embodiment, the electroactive material is a lithium ion-based material. Lithium ion batteries have proven useful for consumer electronics as well as electric and hybrid electric vehicles due to high energy and power densities, allowing them to charge and discharge rapidly. Exemplary lithium ion materials include:

LiMPO$_4$, wherein M represents one or more metals selected from Fe, Mn, Co, and Ni;

LiM'O$_2$, wherein M' represents one or more metals selected from Ni, Mn, Co, Al, Mg, Ti, V, Cr, Fe, Zr, Ga, and Si;

Li(M")$_2$O$_4$, wherein M" represents one or more metals selected from Ni, Mn, Co, Al, Mg, Ti, V, Cr, Fe, Zr, Ga, and Si (e.g., Li[Mn(M")]$_2$O$_4$); and Li$_{1+x}$(Ni$_y$Co$_{1-y-z}$Mn$_z$)$_{1-x}$O$_2$, wherein x ranges from 0 to 1, y ranges from 0 to 1 and z ranges from 0 to 1.

In one embodiment, the electroactive material is selected from at least one of LiNiO$_2$; LiNi$_x$Al$_y$O$_2$ where x varies from 0.8-0.99, y varies from 0.01-0.2, and x+y=1; LiCoO$_2$; LiMn$_2$O$_4$; Li$_2$MnO$_3$; LiNi$_{0.5}$Mn$_{1.5}$O$_4$; LiFe$_x$Mn$_y$Co$_z$PO$_4$ where x varies from 0.01-1, y varies from 0.01-1, z varies from 0.01-0.2, and x+y+z=1; LiNi$_{1-x-y}$Mn$_x$Co$_y$O$_2$, wherein x ranges from 0.01 to 0.99 and y ranges from 0.01 to 0.99; and layer-layer compositions containing an Li$_2$MnO$_3$ phase or a LiMn$_2$O$_3$ phase.

In one embodiment, the electroactive material is selected from at least one of Li$_2$MnO$_3$; LiNi$_{1-x-y}$Mn$_x$Co$_y$O$_2$ wherein x ranges from 0.01 to 0.99 and y ranges from 0.01 to 0.99; LiNi$_{0.5}$Mn$_{1.5}$O$_4$; Li$_{1+x}$(Ni$_y$Co$_{1-y-z}$Mn$_z$)$_{1-x}$O$_2$, wherein x ranges from 0 to 1, y ranges from 0 to 1 and z ranges from 0 to 1; and layer-layer compositions containing at least one of an Li$_2$MnO$_3$ phase and an LiMn$_2$O$_3$ phase.

In one embodiment, the graphene is obtained from commercially available sources. In another embodiment, the graphene can be formed by separation of graphene sheets (e.g., via exfoliation) from a graphite or carbon fiber material by, e.g., subjecting the graphite or carbon fiber material to acidic conditions (e.g., sulfuric or nitric acid), followed by shearing processes such as milling, sonification, etc. The graphenes can be obtained/prepared by any source/method known in the art given the graphene dimensions disclosed herein.

Another embodiment provides a cathode, comprising:
an electroactive material; and
graphene interspersed with the active material;
wherein a ratio of (mean electroactive material domain size)/(mean graphene lateral domain size) ranges from 3:2 to 15:1.

The cathode comprises graphene interspersed with the electroactive material wherein the electroactive material is the majority component in the cathode formulation. The choice of electroactive material may depend on specific capacity desired, as each active material has a theoretical specific capacity relating to the maximum amount of capacity that it can store. Table 1 lists the specific capacities for various electroactive materials.

TABLE 1

| Electroactive Material | Theoretical Capacity (mAh/g) | Practical Capacity | Voltage vs. Li anode |
|---|---|---|---|
| Cobalt Oxide | 273 | 140 | 3.6 |
| NiCo Oxide | 240 | 180 | 3.5 |
| Layered Mn Oxide | 285 | 190 | 3.8 |
| Iron Phosphate | 170 | 150 | 3.2 |

For example, if the cathode comprises 90% active material, then the theoretical specific capacity of the cathode will approximate 90% of the value for that particular active material. Thus, it is often desirable to maximize the amount of electroactive material in the cathode and by minimizing the amount of conductive material and other components present in the cathode. It has been discovered that the graphenes disclosed herein can be included in sufficiently small amounts to maximize the amount of electroactive material and thereby maximize the specific capacity of the cathode. In one embodiment, the graphene is present in the cathode in an amount ranging from 0.1 to 2.5% by weight relative to the total weight of the cathode, such as an amount ranging from 0.1 to 2%, from 0.5 to 2%, from 0.1 to 1.5%, or an amount ranging from 0.1 to 1.25%.

In one embodiment, the graphene is present in the cathode in an amount sufficient to form an electrically conductive pathway across a dimension of the cathode. FIG. 1 schematically illustrates the conductive pathway provided by the graphenes disclosed herein. Cathode formulation 2 comprises a plurality of domains of an electroactive material 4, each domain being substantially surrounded by a plurality of graphenes 6a to provide short range conductivity about each domain 4. Another plurality of graphenes 6b are collectively arranged to form a pathway extending along the plurality of domains 4 to provide long range conductivity throughout a cathode dimension. Some graphenes may be positioned to provide both short range and long range conductivity.

Without wishing to be bound by any theory, the mean lateral domain size of the graphene (e.g., ranging from 0.5 to 10 μm or from 1 μm to 5 μm) of the graphene coupled with the relatively small thickness of the graphene (e.g., 2-20 layer or 3-15 layer) can enhance the long range conductivity across a cathode dimension compared to conventional conductive carbon materials. The relative dimensions of the electroactive material domain to the graphene domain are schematically represented in FIGS. 2A and 2B, where FIG. 2A shows the dimensions of the electroactive material 14 in relation to graphene 16 in accordance with the embodiments disclosed herein. It can be seen that these relative dimensions provide sufficient short range conductivity surrounding each electroactive material domain while enabling long range conductivity without an excessive number of contact points between the graphene to graphene domains. Having improved short and long range connectivity increases electron transport capability through the cathode, thereby decreasing voltage drop across the cathode with the end result of increased power capability.

The dimensions disclosed herein are contrasted with those not in accordance with the embodiments disclosed herein and are schematically illustrated in FIG. 2B. FIG. 2B shows domain sizes of the electroactive material 14' domain and graphene 16' lateral domain where the ratio is less than 3:2. Without wishing to be bound by any theory, it can be seen from FIG. 2B that the short range conductivity can be interrupted due to the large size of the lateral graphene domain, resulting in a reduction in cathode productivity. Thus, having a (mean electroactive material domain)/(mean graphene lateral domain) ratio of less than 3:2 results in insufficient graphene coating of the electroactive material and therefore poorer short range conductivity.

Without wishing to be bound by any theory, at (mean electroactive material domain)/(mean graphene lateral domain) ratios greater than 15:1, or greater than 10:1, the number of overlap or contact points between the graphene sheets increases. Due to the junction or point contact resistance between graphene sheets of this smaller domain size, with respect to the electroactive material, the overall resistance will increase. This will cause the beneficial effect of the graphene or FLG to be reduced relative to the materials that have a ratio of 15:1 or less. For example, very small sheets (e.g., 200 nm in diameter or less) may be less effective when used with electroactive material that is larger than 3 µm or 2 µm. To counterbalance any possible negative effects of graphene-graphene overlap, the graphene-electroactive material overlap is maximized at lower domain size for the graphene. However, at ratios greater than 15:1 the beneficial contact of the graphene-electroactive contacts is overweighed by the detrimental effects of short domain size on the graphene-graphene overlap.

For certain applications, cathodes having relatively thicker dimensions may be desired to meet energy density requirements. Improved electron transport properties can become even more beneficial as the cathode thickness increases. In one embodiment, the cathode dimension is a thickness of at least 10 µm, such as a thickness of at least 50 µm, or a thickness ranging from 50 µm to 200 µm, e.g., a thickness ranging from 50 µm to 100 µm. In alternative embodiments, thinner cathodes can be constructed to have dimensions ranging from 10 µm to 50 µm, e.g., from 20 µm to 50 µm.

In one embodiment, the cathode comprising the materials disclosed herein has a performance, as defined by a discharge capacity at 4 C current, of at least 130 mAh/g, e.g., ranging from 140 mAh/g to 200 mAh/g.

In one embodiment, the cathode further comprises a binder. Exemplary binder materials include but are not limited to fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, styrene-butadiene rubber (SBR), and fluoro rubber and copolymers and mixtures thereof.

Another embodiment provides a method of making a cathode, comprising:

combining particles comprising an electroactive material, a graphene, and a binder in the presence of a solvent to produce a paste, wherein a ratio of (mean electroactive material domain size)/(mean graphene lateral domain size) ranges from 3:2 to 15:1 (e.g., from 3:2 to 10:1);

depositing the paste onto a substrate; and; and forming the cathode.

In one embodiment, the paste is the product of combining particles comprising electroactive material with graphene and binder in the presence of a solvent. In one embodiment, the paste has a sufficiently high solids loading to enable deposition onto a substrate while minimizing the formation of inherent defects (e.g., cracking) that may result with a less viscous paste (e.g., having a lower solids loading). Moreover, a higher solids loading reduces the amount of solvent needed. In one embodiment, the solids loading is at least 65%, e.g., a solids loading ranging from 65% to 85% or ranging from 74% to 81%.

The particles can be combined in the solvent in any order so long as the resulting paste is substantially homogeneous, which can be achieved by shaking, stirring, etc. The particles can be formed in situ or added as already formed particles having the domain sizes disclosed herein. Exemplary solvents include e.g., N-methylpyrrolidone, acetone, alcohols, and water.

In one embodiment, the method comprises depositing the paste onto a substrate, such as a current collector (e.g., an aluminum sheet), followed by forming the cathode. In one embodiment, "forming the cathode" comprises removing the solvent. In one embodiment, the solvent is removed by drying the paste either at ambient temperature or under low heat conditions, e.g., temperatures ranging from 20° to 100° C.

In one embodiment, forming the cathode can be accomplished in several steps. For example, the forming can comprise depositing the paste onto a current collector (e.g., an aluminum sheet), and drying the paste on the current collector to form the solid. In this regard, the solvent removal is subsumed in the forming step. The forming can further comprise cutting the deposited cathode/Al sheet to the desired dimensions followed by calendering to achieve a desired cathode porosity. Generally, cathode porosity results in improved ionic (e.g., Li ion) conductivity. Calendering can be performed with stainless steel rollers to achieve a desired cathode porosity, as known in the art. In one embodiment, the cathode has a porosity ranging from 10 to 50%, e.g., a porosity ranging from 15 to 30%.

Another embodiment provides a cathode paste for making a cathode. The cathode paste comprises particles comprising:

an electroactive material;

a graphene; and a binder;

wherein a ratio of (mean electroactive material particle size)/(mean graphene lateral size) ranges from 3:2 to 15:1 (e.g., from 3:2 to 10:1), and wherein the paste has a solids loading of at least 65%.

In one embodiment, the graphene dimensions disclosed herein contribute to a higher solids loading due to the thin, platelike structure when compared to, e.g., carbon black, which has a higher structure or other graphene particles having dimensions outside the claimed range. In one embodiment, the paste has a solids loading ranging from 65% to 85%, such as a solids loading ranging from 74% to 81%. In one embodiment, the higher solids loading translates to higher viscosities, such as a viscosity ranging from 100 cP to 10,000 cP, such as a viscosity ranging from 2,000 cP to 7,000 cP when measured with a Brookfield Viscometer Model HB using a SC4-18 type spindle at 10 RPM.

Another embodiment provides an electrochemical cell (battery) comprising the cathodes comprising the materials disclosed herein. In one embodiment, the use of the disclosed cathode formulations can result in a cathode/cell having one or more improved properties, including:
- increased specific capacity, achieved e.g., by lower loading of graphene (0.1% to 2.5%) relative to conventional conductive carbon materials (e.g., carbon black);
- conductivity enhancements at low graphene loading;
- increased power (lower voltage drop across cathode);
- for higher energy density applications, increased cathode thicknesses are enabled by use of graphenes due to improved conductivity and electrode mechanical properties;
- improved adhesion compared to carbon black;
- higher solids loading in a cathode paste with little impact on desired paste rheology; and
- improved energy and/or power densities.

EXAMPLES

Example 1

This Example describes the preparation of cathode pastes incorporating various graphenes as a conductive aid. The surface area, lateral domain, and thickness properties of these graphenes are listed in Table 2 below. Graphenes A and B are aggregates whereas Graphene C and Comparative Graphene D are platelets.

TABLE 2

| Sample | SA ($m^2/g$) | Ext. SA* ($m^2/g$) | Thickness (nm) | Lateral Domain ($\mu m$) |
|---|---|---|---|---|
| Graphene A | 670 | 522 | 1.3 | 2 |
| Graphene B | 349 | | 2.5 | 2 |
| Graphene C | 120 | | 7.2 | 5 |
| Comp Graphene D | 120 | | 7.2 | 25 |

*Ext. SA is external surface area which is defined as the BJH desorption cumulative surface area of pores that are greater than 1.7 nm in diameter.

An exemplary cathode paste (Sample A1) is prepared as follows. A precipitation-made lithium nickel-cobalt-manganese oxide ($LiNi_{0.5}Co_{0.2}Mn_{0.3}O_2$, mean particle size=10 μm, 13.055 g) was combined with 7.6 weight % polyvinylidene fluoride in NMP (0.46 g) dissolved in N-methylpyrrolidone (NMP, 2.90 g), resulting in a total of 0.033 g of PvDF and 3.327 g of NMP. To this mixture was added the graphene (Graphene A, 0.033 g). Two tungsten carbide media were added to the mixture and shaken via a Spex mixer for 30 minutes, yielding a 79.8 wt % solids cathode paste having 0.25 wt % graphene relative to the total solids content.

The solids loading of the cathode pastes are listed in Table 3 below. As a comparison, a cathode paste (Comp Paste) were also prepared with a carbon black (Comparative CB (carbon black)) as the conductive filler, having the following properties: BET surface area=53 $m^2/g$; OAN=130 mL/100 g; STSA=53 $m^2/g$.

TABLE 3

| Sample | Wt % Conductive filler | Wt % PvDF | Solids Loading | Adhesion | Cohesion |
|---|---|---|---|---|---|
| A1 | 0.25 | 0.25 | 79.8 | Good | Good |
| A2 | 0.5 | 0.5 | 77.6 | Good | Good |
| A3 | 1 | 1 | 75.0 | Good | Good |
| A4 | 3 | 3 | 64.9 | Good | Good |
| Comp Paste | 3 | 3 | 65.1 | Good | Good |

It can be seen that pastes according to the embodiments disclosed herein are capable of high solids loading (e.g., of at least 65%), enabled by the lower loading of graphenes. It can be seen that a high solids loading is achieved at 0.25 wt % graphene compared to the Comp Paste slurry prepared with carbon black at 3 wt %.

Example 2

This Example describes the preparation of cathodes from cathode pastes. The pastes were prepared in the same manner as described in Example 1, in proportions outlined in Table 4. Comparative Sample 1 incorporates the Comparative CB described in Example 1, and Comparative Sample 2 incorporates Comparative Graphene D as the conductive filler.

TABLE 4

| | | $LiNi_{0.5}Co_{0.2}Mn_{0.3}O_2$ active loadings [$mg/cm^2$]/Thickness with Al foil [microns]/Porosity [%] | | | |
|---|---|---|---|---|---|
| Sample | Conductive Filler, Loading (wt. %) => | 0.25% | 0.50% | 1% | 3% |
| A1-A4 | Graphene A | 8.26/40/13.9 | 8.95/41/12.3 | 8.31/40/13.2 | 9.80/48/19.9 |
| B2-B3 | Graphene B | | 8.84/41.5/12.9 | 8.22/41/15.8 | |
| C2-C3 | Graphene C | | 8.84/42.5/15.9 | 8.26/41/15.6 | |
| Comp 1 | Comparative CB | | 8.65 | 8.07 | 7.50/46/19.3 |
| Comp 2 | Comparative Graphene D | | | 7.53/39/15.2 | |

The paste was mechanically drawndown on an etched aluminum sheet (17 μm thickness) and subsequently dried at 80° C. for 1 h. After drying, circular disks were cut out of the sheet and calendered between two stainless steel rollers to a desired porosity, as listed in Table 4. These disks were dried overnight at 80° C. and placed in a glovebox for coin cell manufacture where the coin cell cathodes have thicknesses (including the Al foil) as listed in Table 4.

Example 3

This Example describes the physical and electrochemical testing of the coin cells of Example 2.

The cathodes were examined via FE-SEM cross-section spectroscopy. The electrochemical properties were investigated via cyclic voltammetry and charge-discharge tests. The specific capacity at specified charge and discharge rates as well as voltage response. Coin cells from the cathodes were tested against a Li metal anode utilizing EC-DMC-EMC (1-1-1) (ethylene carbonate/dimethyl carbonate/ethylmethyl carbonate, 1:1:1) as the solvent, VC1%, (VC=vinylene carbonate, 1 C rate=current needed to discharge the battery in 1 h, e.g., 2 C in 0.5 h, 0.5 C in 2 h), and LiPF6 as the electrolyte (Novolyte). Energy density and power density (at 1000 W/kg and 2000 W/kg) values were obtained and listed in Tables 5-7. Power density (W/g) is calculated as V(V)*I(A)/m (g) where V is average discharge voltage, I is discharge current and m is weight of active powder in the cathode.

TABLE 5

Specific Capacity [mAh/g @ 4C]

| Sample | Conductive Filler, Loading (wt. %) => | 0.25% | 0.50% | 1% | 3% |
|---|---|---|---|---|---|
| A1-A4 | Graphene A | 144.50 | 143.19 | 142.13 | 131.20 |
| B2-B3 | Graphene B | | 140.50 | 143.64 | |
| C2-C3 | Graphene C | | 125.36 | 142.75 | |
| Comp 1 | Comparative CB | | 136.17 | 137.38 | 138.08 |
| Comp 2 | Comparative Graphene D | | | 131.58 | |

TABLE 6

Energy Density [Wh/kg @ 1000 W/kg]

| Sample | Conductive Filler, Loading (wt. %) => | 0.25% | 0.50% | 1% | 3% |
|---|---|---|---|---|---|
| A1-A4 | Graphene A | 591.90 | 578.05 | 579.60 | 522.98 |
| B2-B3 | Graphene B | | 571.30 | 580.50 | |
| C2-C3 | Graphene C | | 543.60 | 585.16 | |
| Comp 1 | Comparative CB | | 530.60 | 569.00 | 604.40 |
| Comp 2 | Comparative Graphene D | | | 556.50 | |

TABLE 7

Energy Density [Wh/kg @ 2000 W/kg]

| Sample | Conductive Filler, Loading (wt. %) => | 0.25% | 0.50% | 1% | 3% |
|---|---|---|---|---|---|
| A1-A4 | Graphene A | 545.22 | 540.60 | 538.04 | 470.32 |
| B2-B3 | Graphene B | | 520.50 | 536.20 | |
| C2-C3 | Graphene C | | 461.30 | 540.80 | |
| Comp 1 | Comparative CB | | 483.60 | 526.00 | 566.80 |
| Comp 2 | Comparative Graphene D | | | 501.09 | |

For Samples A1-A4, it can be seen that the energy density values reach a maximum at 1% loading and provide reasonable values at loadings of 0.25% and 0.5%. Samples containing Graphene B and Graphene C also yield high performance values at low loadings. In contrast, the carbon black-containing sample (Comparative Sample 2) achieves poorer results at loadings of 1% and requires a much higher loading of 3% for acceptable results. For Comparative Sample 2 containing a graphene having a (mean electroactive material domain size)/(mean graphene lateral domain size) ratio of less than 3:2, the performance at 1% loading is noticeably less compared to the samples prepared according to the claimed invention.

The domain size of the electroactive material can also be a contributing effect to the improved performance of cathodes containing graphenes versus carbon black. Table 8 below provides data for $LiNi_{0.33}Co_{0.33}Mn_{0.33}O_2$ having a domain size of 2 μm (prepared by reactive spray technology, as described in U.S. Pat. No. 6,770,226, the disclosure of which is incorporated herein by reference), which would reduce the (mean electroactive material domain size)/(mean graphene lateral domain size) ratio to below 3:2 for all the samples.

TABLE 8

| Sample | Conductive Filler, Loading (wt. %) => | Specific Energy [mAh/g @ 4C] | | $LiNi_{0.33}Co_{0.33}Mn_{0.33}O_2$ (2 μm) [mg/cm²] |
|---|---|---|---|---|
| | | 1% | 3% | |
| A4 | Graphene A | | 89.21 | 10.25 |
| B4 | Graphene B | | 57.12 | 10.48 |
| C3 | Graphene C | 4.60 | | 9.47 |
| D4 | Comparative Graphene D | | 71.76 | 9.59 |
| Comp 1 | Comparative CB | | 110.55 | 9.98 |

It can be seen from Table 8 that substitution of carbon black (LITX50) for graphenes results in only a minor improvement for materials in which the (mean electroactive material domain size)/(mean graphene lateral domain size) ratio is less than 3:2 (see Tables 5-7).

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed invention and does not pose a limitation on the scope of the claimed invention unless otherwise claimed. No language in the specification should be construed as indicating any non-claimed element as essential to the practice of the claimed invention.

The invention claimed is:

1. A cathode formulation comprising:
an electroactive material; and
graphene interspersed with the electroactive material;

wherein a ratio of (mean electroactive material domain size)/(mean graphene lateral domain size) ranges from 3:2 to 15:1, and wherein the cathode formulation is in the form of a paste or a slurry.

2. The cathode formulation of claim 1, wherein the electroactive material has a domain size ranging from 3 to 20 µm.

3. The cathode formulation of claim 1, wherein the graphene has a BET surface area ranging from 80 to 800 m$^2$/g.

4. The cathode formulation of claim 1, wherein the graphene is a 2-20 layer graphene.

5. The cathode formulation of claim 1, wherein the graphene has a mean lateral domain size ranging from 0.5 to 10 µm.

6. The cathode formulation of claim 1, wherein the ratio of (mean electroactive material domain size)/(mean graphene lateral domain size) ranges from 3:2 to 10:1.

7. The cathode formulation of claim 1, wherein the electroactive material is a lithium ion-based material.

8. The cathode formulation of claim 1, wherein the graphene is present in an amount ranging from 0.1 to 2.5% by weight relative to the total weight of the cathode formulation.

9. A cathode, comprising:
an electroactive material; and
graphene interspersed with the electroactive material;
wherein a ratio of (mean electroactive material domain size)/(mean graphene lateral domain size) ranges from 3:2 to 15:1.

10. The cathode of claim 9, wherein the graphene is present in the cathode in an amount ranging from 0.1 to 2.5% by weight relative to the total weight of the cathode.

11. The cathode of claim 9, wherein the cathode has a performance, as defined by a discharge capacity at 4 C current, of at least 130 mAh/g.

12. The cathode of claim 9, further comprising a binder.

13. The cathode of claim 12, wherein the binder is selected from fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), polyethylene, polypropylene, ethylene-propylene-diene terpolymer (EPDM), sulfonated EPDM, styrene-butadiene rubber (SBR), and fluoro rubber, and copolymers and mixtures thereof.

14. The cathode of claim 9, wherein the graphene is a 2-20 layer graphene having a mean lateral domain size ranging from 0.5 to 10 µm.

15. The cathode of claim 9, wherein the electroactive material is a lithium ion-based material.

16. A method of making a cathode, comprising:
combining particles comprising an electroactive material, a graphene, and a binder in the presence of a solvent to produce a paste having a solids loading of at least 65% by weight, wherein a ratio of (mean electroactive material domain size)/(mean graphene lateral domain size) ranges from 3:2 to 15:1; and
depositing the paste onto a substrate; and
forming the cathode.

17. The method of claim 16, wherein the combining comprises adding a sufficient amount of particles to achieve a solids loading of at least 80% by weight.

18. The method of claim 16, wherein the forming comprises removing the solvent.

19. A cathode paste containing particles comprising:
an electroactive material;
a graphene; and
a binder;
wherein a ratio of (mean electroactive material domain size)/(mean graphene lateral domain size) ranges from 3:2 to 15:1, and
wherein the paste has a solids loading of at least 65% by weight.

20. The cathode paste of claim 19, wherein the viscosity of the paste ranges from 100 cP to 10,000 cP.

* * * * *